United States Patent [19]

Sugita et al.

[11] Patent Number: 4,638,525

[45] Date of Patent: Jan. 27, 1987

[54] WIPER BLADE RUBBER

[75] Inventors: Hiroshi Sugita; Tadanobu Iwasa; Takemasa Yasukawa; Masanori Aritake, all of Aichi, Japan

[73] Assignee: Toyoda Goseki Co., Ltd., Nishikasugai, Japan

[21] Appl. No.: 758,091

[22] Filed: Jul. 23, 1985

[30] Foreign Application Priority Data

Jul. 30, 1984 [JP] Japan .................. 59-160953

[51] Int. Cl.⁴ .............................. B60S 1/38
[52] U.S. Cl. .................... 15/250.36; 428/174
[58] Field of Search .............. 428/156, 174; 15/250.36

[56] References Cited

U.S. PATENT DOCUMENTS 3,035,297  5/1962  Overman et al. ........... 15/250.36
4,103,385  8/1978  Porter .................... 15/250.36
4,300,970 11/1981  Honda et al. ............. 156/244.11

FOREIGN PATENT DOCUMENTS 809228  2/1959  United Kingdom ......... 15/250.36

Primary Examiner—Paul J. Thibodeau
Attorney, Agent, or Firm—Cushman, Darby & Cushman

[57] ABSTRACT

A wiper blade rubber is disclosed. The wiper blade rubber comprises a matrix formed of rubber made preponderantly of EPDM and vulcanized with a peroxide and a lip part having the portions thereof for sliding contact with the outer surface of a wind shield formed of chlorinated diene type rubber. The lip part has the opposite lateral sides in the direction of thickness of the leading end thereof formed of diene type rubber containing a chlorinated layer on the surface thereof, with the matrix exposed to sight at the leading edge of the lip part between the opposite lateral sides of diene type rubber. The diene type rubber in each of the opposite lateral sides has the outer surface thereof chlorinated.

11 Claims, 6 Drawing Figures

WIPER BLADE RUBBER

BACKGROUND OF THE INVENTION

1. Field of the Invention

This invention relates to a wiper blade rubber which offers inconspicuous sliding resistance and excels in resistance to weather conditions and resistance to ozone cracking.

2. Description of the Prior Art

Referring to FIG. 6 generally wiper blade rubber stock is molded in the form of a strip the cross section of which comprises in combination a base part 1 of large thickness, a roughly triangular vibration part 3 connected through the medium of a neck part 2 to the aforementioned base part 1, and a lip part 4 of the shape of a thin plate formed at the leading end of the aforementioned vibration part 3, as illustrated in FIG. 6. The stock, as formed into wiper blade rubbers, is used as a wiping member of a wiper and adapted to slide on the outer surface of a windshield such as that of an automobile and serves to remove water drops adhering on the outer surface by the sliding motion of the wiping member on the windshield.

The usual wiper blade is formed of natural rubber or a blend of natural rubber with chloroprene rubber or a diene rubber such as styrene-butadiene rubber or butadiene rubber. Thus, it has the merit of possessing flexibility and, at the same time, the demerit of offering high sliding resistance. When the conventional wiper blade uses a diene rubber, the double bond in the rubber composition used to make the wiper blade is oxidized by the ozone in the air and consequently is caused to sustain ozone cracking. The conventional wiper blade, therefore, has detrimental feature particularly that the neck part 2 exhibits sufficient durability.

As means of lowering the sliding resistance of the wiper blade rubber, the method of hardening the wiper blade rubber by chlorinating the surface and the method of covering the wiper blade rubber with a surface layer containing a finely divided sliding powder such as powdered molybdenum disulfide have been known to the art. The chlorinated surface of diene rubber is less liable to ozone cracking. When the surface of the wiper blade rubber is wholly chlorinated, it is so rigid that it will not conform to the contour of the surface of the windshield with sufficient smoothness. It is, therefore, necessary that the treatment of chlorination should be performed mildly as a whole or should be given to the wiper blade rubber except for the neck part 2. So long as any diene rubber is used in the wiper blade rubber, the occurrence of ozone cracking cannot be precluded. The aforementioned surface layer containing the finely divided sliding powder such as powdered molybdenum is useless in preventing the occurrence of ozone cracking.

SUMMARY OF THE INVENTION

An object of this invention is to provide a wiper blade rubber which offers only inconspicuous sliding resistance and precludes loss of durability due to occurrence of ozone cracking.

Another object of this invention is to provide a wiper blade rubber which can be smoothly incorporated in a wiper.

As a way of overcoming the aforementioned weak point, the present invention adopts a construction wherein at least the portion to be slid on the outer surface of the windshield is formed of chlorinated diene rubber and the matrix is formed of rubber made preponderantly of EPDM and vulcanized with peroxide.

The wiper blade rubber of the present invention is obtained by co-extrusion molding (multi-color extrusion molding) a rubber material made preponderantly of EPDM and a diene rubber material in an unvulcanized state thereby producing a molded strip of fixed cross-section, then vulcanizing the aforementioned strip, and thereafter subjecting the vulcanized strip to a chlorinating treatment thereby forming a chlorinated layer on the surface of the diene rubber.

The extrusion molding itself can be effected by adopting the conventional multi-color extrusion molding technique available for rubber in its unmodified form. Since the lip part of the wiper blade rubber is extremely thin, generally falling in the range of 0.5 to 1.0 mm, the extrusion molding technique to be adopted is required to be of highly advanced level. In the technical field to which the present invention pertains, the multi-color extrusion of rubber in a thickness of the order of 0.1 mm can be stably carried out. The integrity of the rubber material made preponderantly of EPDM and the diene type rubber material in the wiper blade rubber is high because the two rubber materials are co-extrusion molded in an unvulcanized state and then vulcanized at the same time. There is no possibility of the two rubber materials separating from each other.

Among the methods available for the chlorination of the diene rubber are counted the method of hypochlorite treatment involving 10 minutes' immersion in an aqueous solution of about 3% of sodium hypochlorite, the method of resorting to some tens of minutes' immersion in an aqueous 0.4% trichloroisocyanuric acid solution at room temperature, and the method of resorting to two to three minutes' immersion in a solution having trichloroisocyanuric acid dissolved in a concentration of 0.5 to 3% in a solvent such as an aromatic hydrocarbon, an ether, a ketone, or a chlorinated hydrocarbon as disclosed in Japanese Patent Application Laid-open No. 56(1981)-63,432 (dated May 30, 1981).

The other objects of this invention will become apparent from the ensuing description of a preferred embodiment, and the appended claims. Any person of ordinary skill in the art, through actual working of this invention, will be reminded of many advantages not touched upon in the text hereof.

DETAILED DESCRIPTION OF THE PREFERRED EMBODIMENTS

Figure 1:
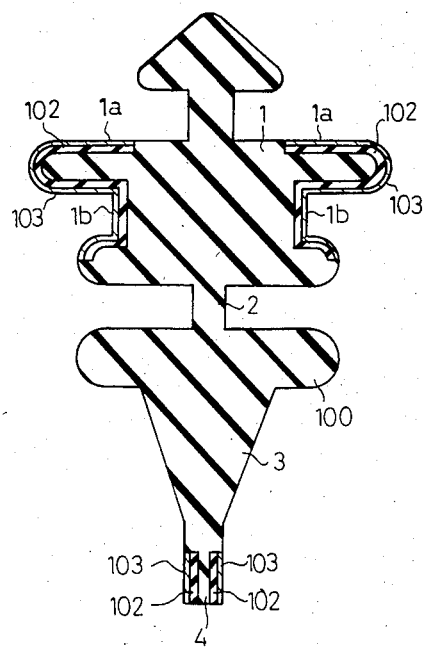
FIG. 1 is a cross section of a wiper blade rubber of the first embodiment of this invention.

Now, the first embodiment of this invention will be described below with reference to FIGS. 1 through 3. A wiper blade rubber is composed of a base part 1, a neck part 2, an approximately triangular vibration part 3, and a lip part 4 disposed at the leading end of the aforementioned vibration part 3.

The matrix of the wiper blade rubber, namely the major portion of the base part 1, the neck part 2, the vibration part 3, and the minor portions of the lip part 4, is made of EPDM rubber 100. Contact portions 1a, 1b of the base part 1 which are destined to come into contact with a metal fixture are made of diene rubber 102 having a chlorinated layer 103 formed on the outer surface thereof. The opposite sides of the leading end of the lip part 4 are also made of diene rubber 102 having a chlorinated layer 103 formed on the outer surface thereof. Incidentally, this wiper blade rubber is about 11.5 mm in height and about 7 mm in width and the lip part 4 thereof is about 0.75 mm in thickness and about 1.9 mm in height.

Now, the method for the production of the wiper blade rubber of the foregoing description will be described below.

In a banbury mixer, 100 parts by weight (hereinafter referred to simply as "parts") of EPDM (a product of Japan Synthetic Rubber Co., Ltd. marketed under trademark designation of JSREP 35), 50 parts of carbon black, HAF, 5 parts of zinc oxide, 1 part of calcium stearate, 5 parts of calcium oxide (a product of Ohmi Chemical Industry Ltd. marketed under trademark designation of CML #31), and 10 parts of a 40:60 dicumyl peroxide/$SiO_2$ mixture were thoroughly mixed to produce an EPDM rubber material.

Separately, 100 parts of styrene-butyl rubber (a product of Japan Synthetic Rubber Co., Ltd. marketed under trademark designation of SBR 1502), 50 parts of carbon black, ISAF, 10 parts of naphthene type process oil, 5 parts of zinc oxide, 1 part of calcium stearate, 5 parts of calcium oxide (a product of Ohmi Chemical Industry Ltd. marketed under trademark designation of CML #31), and 7 parts of a 40:60 dicumyl peroxide/$SiO_2$ mixture were thoroughly mixed in a banbury mixer to produce a diene type rubber material.

Figure 2:
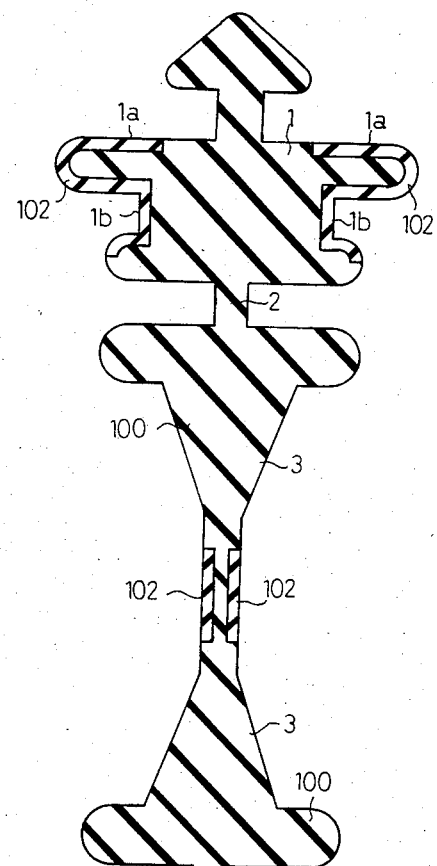
FIG. 2 is a cross-section of an extrusion molded material formed for the production of the wiper blade rubber of FIG. 1.
Figure 3:
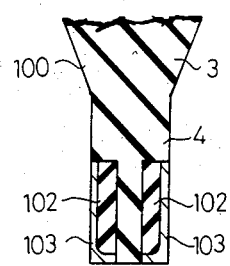
FIG. 3 is a cross-section of an essential part having the lip part chlorinated thoroughly to the corner portions thereof.

With an extruding machine, the two rubber materials described above were co-extrusion molded to obtain an extrusion molded material of the cross-section illustrated in FIG. 2. This extrusion molded material is of a shape having two wiper blade rubbers symmetrically joined along the leading ends of their respective lip parts 4 and having the diene type rubber 102 disposed in the opposite lateral sides of the central portion and in the contact portions 1a, 1b of the base part 1 intended for contact with metal fixtures.

Subsequently, the extrusion molded material is heated to be vulcanized with the dicumyl peroxide mingled in the rubber materials. The extrusion molded material so vulcanized was then immersed for chlorination in an aqueous 0.4% trichloroisocyanuric acid solution at room temperature for 40 minutes, to form a chlorinated layer 103 (indicated in FIG. 1) on the surface of the diene type rubber 102. Finally, a cut was made long the center of the extrusion molded material with a sharp blade, to produce wiper blade rubbers having the cross-section illustrated in FIG. 1.

The wiper blade rubber of the present embodiment has the diene type rubber 102 incorporating a chlorinated layer 103 disposed each in the opposite lateral sides in the direction of thicknes at the leading end of the lip part 4. At the center in the leading end of the lip part 4, the EPDM rubber 100 having a large coefficient of friction is exposed to sight.

When the wiper blade rubber is incorporated in a wiper and reciprocated on the outer surface of a wind shield, therefore, at each of the positions at which the direction of sliding is reversed, the leading end of the lip part 4 of the wiper blade rubber comes into contact with the outer surface of the windshield and the central portion of the leading end of the lip part 4 having a large coefficient of friction comes into contact with the outer surface of the wind shield and give rise to high frictional resistance. At the time the wiper is reversed, the leading end face of the lip part 4 momentarily assumes a state fixed on the outer surface of the windshield and the base part 1 of the wiper blade rubber is urged by the wiper arm and reversed in the direction of advance. Then, the base part 1 in the reversed state pulls the vibration part 3, with the result that the lip part 4 at the leading end of the vibration part 3 will be made to follow it.

The corner of the lateral side of the lip part 4 falling toward the advance thereof and the leading end face thereof constantly slides on the outer surface of the windshield and removes water drops adhering to the outer surface. Thus, the wiper is enabled to remove water drops with certainty from the outer surface of the wind shield. Since the lip part 4 has its opposite lateral sides used alternately, the wiper does not suffer from the disadvantage that one of the lateral sides of the lip part 4 will be worn more quickly than the other. Moreover, in the wiper blade rubber of the present embodiment, since the diene rubber 102 of relatively rigid grade of SBR incorporating the carbon black, ISAF, and possessing a chlorinated surface layer is disposed in the opposite lateral sides of the leading end of the lip part 4 which serve as glass sliding portions, the chlorinated layer 103 enjoys enhanced resistance to friction.

The treatment for chlorination may be carried out after the extrusion molded material has been vulcanized and cut into two wiper blade rubbers. When this treatment is carried out after the extrusion molded material has been cut as described above, as shown in FIG. 3, the produced wiper blade rubbers enjoy improved durability because the chlorinated layer 103 is formed not only on the lateral sides of the lip part 4 but also on the surface of the diene type rubber 102 at the leading part thereof. This is because the corners of the leading end face and the lateral faces of the lip part 4 are slid on the outer surface of the wind shield when the wiper blade rubber is incorporated in the wiper and reciprocated on the outer surface of the windshield and, consequently, so long as the chlorinated layer 103 is formed not merely on the lateral sides but also on the leading end face, the chlorinated layer 103 is allowed to slide on the outer surface of the windshield with certainty, no matter whether the thickness of the chlorinated layer 103 is small.

Further, the wiper blade rubber of the first embodiment can be smoothly incorporated in the wiper and allowed to follow the motion of the wiper arm smoothly because the contact portions 1a, 1b of the base part 1 destined to come into contact with the metal fixture of the wiper blade are formed of the diene type rubber 102 incorporating a chlorinated layer 103.

Figure 4:
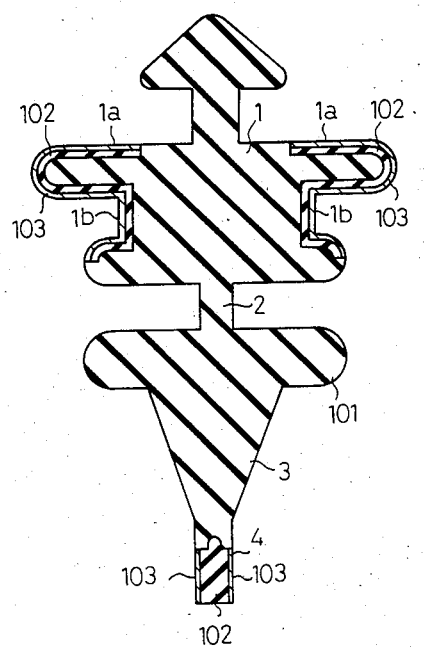
FIG. 4 is a cross-section of a wiper blade rubber as the second embodiment of this invention.

Now, the second embodiment of this invention will be described below with reference to FIGS. 4 and 5. The wiper blade rubber of this embodiment differs from the foregoing embodiment in respect that the leading end of the lip part 4 is wholly made of diene type rubber 102, the chlorinated layer 103 is formed each on the opposite lateral sides of the lip part 4, and rubber made preponderantly of EPDM (mixture of EDPM and natural rubber) 101 is used in the place of EPDM rubber 100.

Figure 5:
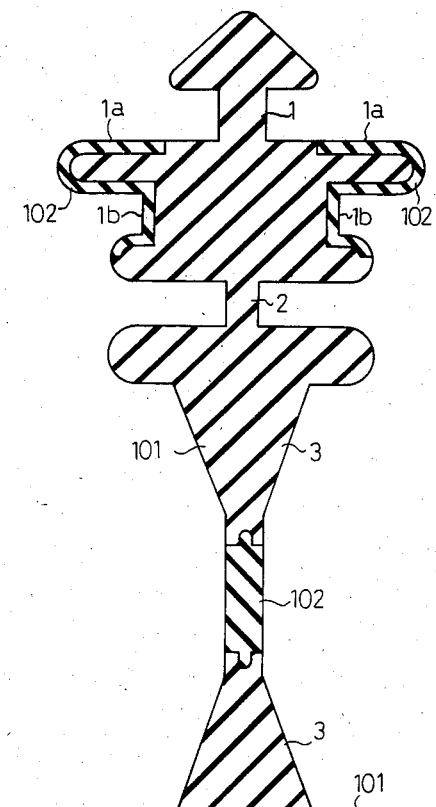
FIG. 5 is a cross-section of an extrusion molded material formed for the production of the wiper blade rubber of FIG. 4.
Figure 6:
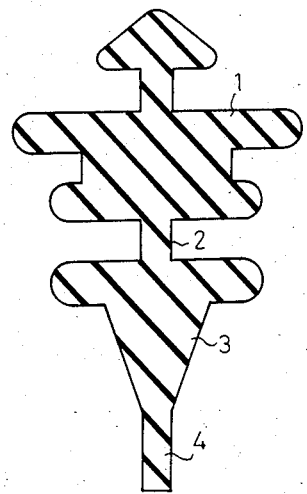
FIG. 6 is a cross-section of a conventional wiper blade rubber.

This wiper blade rubber is obtained by preparing the same diene rubber material as used in the first embodiment, separately preparing a rubber material formed preponderantly of EPDM by thoroughly mixing 70 parts of EPDM (a product of Japan Synthetic Rubber Co., Ltd. marketed under trademark designation of JSREP35), 30 parts of natural rubber, 50 parts of carbon black, HAF, 5 parts of zinc oxide, 1 part of calcium stearate, 5 parts of calcium oxide (a product of Ohmi Chemical Industry Ltd. marketed under trademark designation of CML #31), and 10 parts of a 40:60 dicumyl peroxide/$SiO_2$ mixture in a banbury mixer, coextrusion molding the two rubber materials mentioned above through an extruding machine thereby producing an extrusion molded material of cross section shown in FIG. 5, subjecting the extrusion molded material to vulcanization and chlorination by following the procedure of Example 1, and making a cut in the central part with a sharp blade.

In this embodiment, the mixed rubber of EPDM and natural rubber is used as the matrix for the wiper blade rubber. Similarly to the wiper blade rubber using the matrix formed solely of EPDM, the wiper blade rubber of this embodiment precludes the occurrence of ozone crack as in the neck part 2 and enjoys enhanced durability as compared with the conventional wiper blade rubber.

This invention is not limited to the two embodiments described above. For example, the mixing ratio of natural rubber to EPDM can be varied, the EPDM can be mixed with isoprene rubber, styrene-butadiene rubber, or chloroprene rubber in the place of natural rubber, the styrene-butadiene rubber as the diene type rubber can be substituted by natural rubber, isoprene rubber, butadiene rubber, or chloroprene rubber, the chlorination of the diene type rubber 102 can be carried out by the treatment with a hypochlorate or by the method resorting to immersion in a solution having trichloroisocyanuric acid in an organic solvent, the wiper blade rubber can be extrusion molded one at a time, or the formation of the diene type rubber 102 on the base part 1 can be omitted.

As described in detail above, the present invention enables the wiper blade rubber to acquire the flexibility indispensable to its satisfactory function, possess excellent resistance to the action of ozone, defy the occurrence of ozone cracking, and assume enhanced durability because the matrix of the wiper blade rubber is formed of a rubber material made preponderantly of EPDM. It further manifests an outstanding effect of decreasing the sliding resistance offered to the outer surface of the windshield because the diene type rubber having a chlorinated layer formed on the outer surface thereof is disposed each on the opposite lateral sides of the leading end of the lip part which are destined to slide on the outer surface of the wind shield.

Obviously, the present invention can be practised otherwise extensively without departing from the spirit and scope of the present invention. It is, therefore, to be understood that this invention is not limited to any specific embodiment while it is required to adhere to what is defined in the appended claims.

What is claimed is:

1. A wiper blade rubber, comprising:
   a longitudinally elongated matrix integrally joined along the length thereof at a forward end thereof, with a lip, both said matrix and said lip having two laterally opposite sides, and said lip having a forward end adapted to be slid in wiping contact with a windshield surface;
   said matrix, at least throughout a major portion thereof exclusive of two laterally-opposed contact portions which are provided for contacting metal wiper fixtures for mounting the wiper blade rubber for windshield wiper use, being made of a rubber mixture which is peroxide-vulcanized preponderantly EPDM rubber;
   said lip, at least on said two laterally opposite sides thereof being made of a preponderantly non-EPDM, surface-chlorinated diene rubber selected from the group consisting of styrene-butadiene, natural rubber, isoprene, butadiene and chloroprene.

2. The wiper blade rubber of claim 1, wherein:
   said lip also is surface-chlorinated on said forward end thereof.

3. The wiper blade rubber of claim 1, wherein:
   said lip, between said two laterally opposite sides is made of said preponderantly peroxide-vulcanized EPDM rubber mixture which is exposed along said forward end.

4. The wiper blade rubber of claim 3, wherein:
   said lip also is surface-chlorinated on said forward end thereof.

5. The wiper blade of claim 1, wherein:
   said lip throughout the thickness thereof between said two laterally opposite sides is made of the same preponderantly non-EPDM diene rubber as said non-EPDM surface-chlorinated rubber.

6. The wiper blade rubber of claim 5, wherein:
   said lip also is surface-chlorinated on said forward end thereof.

7. The wiper blade rubber of claim 1, wherein:
   said two laterally-opposed contact portions thereof are made of the same preponderantly non-EPDM diene rubber as said non-EPDM surface-chlorinated diene rubber.

8. The wiper blade rubber of claim 7, wherein:
   said contact portions also are surface-chlorinated.

9. The wiper blade rubber of claim 1, wherein:
   said matrix comprises a relatively broad base, and a vibration part having a relatively broad trailing end and which tapers from said trailing end towards said lip, said base and said vibration part being integrally joined by a relatively narrow neck.

10. The wiper blade rubber of claim 9, wherein:
    said matrix further comprises a relatively minor portion of said lip adjacent said relatively narrow neck.

11. The wiper blade rubber of claim 1, wherein:
    said rubber mixture contains no significant amount of any other rubber than EPDM rubber.

* * * * *